United States Patent [19]
Randall, Jr. et al.

[11] Patent Number: 5,090,594
[45] Date of Patent: Feb. 25, 1992

[54] VOLUMETRIC FLUID DISPENSING APPARATUS AND METHOD

[75] Inventors: John R. Randall, Jr., Freehold, N.J.; Denis E. Keyes, Staten Island, N.Y.; James V. Curcio, South Plainfield, N.J.

[73] Assignee: FlowClean Equipment, Inc., Rocky Hill, N.J.

[21] Appl. No.: 641,278

[22] Filed: Jan. 15, 1991

[51] Int. Cl.$^5$ .............................................. B67D 5/08
[52] U.S. Cl. ........................................ 222/1; 222/61; 222/64
[58] Field of Search ................... 222/1, 56, 61, 64, 65, 222/67, 424.5, 457

[56] References Cited

U.S. PATENT DOCUMENTS

| | | |
|---|---|---|
| 3,583,437 | 6/1971 | Mastroianni et al. ................. 222/64 |
| 4,583,664 | 4/1986 | Bayat ................................... 222/61 |
| 4,821,921 | 4/1989 | Cartwright et al. ................. 222/65 |

FOREIGN PATENT DOCUMENTS 50261  4/1977  Japan ..................... 222/64

Primary Examiner—Robert P. Olszewski
Assistant Examiner—Steven M. Reiss
Attorney, Agent, or Firm—Rhodes, Coats & Bennett

[57] ABSTRACT

A fluid dispensing apparatus having no moving parts in contact with the fluid includes a fluid chamber and a measuring cup having an open top disposed in the fluid chamber. The fluid chamber is connected to a fluid source which supplies fluid to fill the chamber to a pre-determined level above the top of the measuring cup. As the fluid chamber is being filled, the fluid overflows and fills the measuring cup. A first sensor indicates when the fluid reaches the pre-determined level above the top of the measuring cup and stops the flow of fluid into the fluid chamber. A drain, which is responsive to the first sensor, drains fluid from the fluid chamber until the fluid level drops to a predetermined level below the top of the measuring cup. As the fluid level in the fluid chamber recedes, a pre-determined volume of fluid is captured in the measuring cup. A second sensor indicates when the fluid level drops to the pre-determined level below the top of the measuring cup and stops the flow of fluid from the fluid chamber. A dispensing valve, which is responsive to the second sensor, dispenses the contents of the measuring cup. A third sensor indicates when the contents of the measuring cup are dispensed and starts the flow of fluid into the fluid chamber to begin a new cycle.

13 Claims, 2 Drawing Sheets

VOLUMETRIC FLUID DISPENSING APPARATUS AND METHOD

BACKGROUND OF THE INVENTION

The present invention relates generally to fluid dispensing apparatuses, and more particularly to a volumetric, pistonless fluid dispensing apparatus having no moving parts in contact with the fluid.

Numerous types of fluid dispensing apparatuses exist for filling bottles. One type of fluid dispensing apparatus which is in widespread use is positive displacement fillers. Positive displacement fillers typically include moving parts which contact and displace the fluid being dispensed. For example, one type of positive displacement filler uses a piston and cylinder arrangement. In this type of positive displacement filler, the backward movement of the piston draws fluid into the cylinder through an inlet port, and the forward movement of the piston expels the fluid through an outlet port. Another type of positive displacement filler uses a rotary pump to move the fluid.

Positive displacement pumps have gained widespread use in the United States for two reasons. First, positive displacement pumps can operate at relatively high speeds, filling as many as six hundred bottles per minute. Additionally, positive displacement pumps are accurate up to about ±0.5%. However, there are distinct disadvantages associated with positive displacement pumps.

One disadvantage with positive displacement fillers is that the fluid comes into contact with moving parts. As the moving parts wear, particulate matter enters the fluid causing particulate contamination. If severe enough, particulate contamination can render the product unusable.

Another important disadvantage with positive displacement fillers involves the difficulty in cleaning and sterilizing the moving parts in contact with the fluid. In positive displacement pumps, the critical tolerances between parts, such as the piston and cylinder, precludes effective cleaning in place. Thus, the user must disassemble the apparatus for cleaning and sterilization. This process is not only time consuming, but may result in biological contamination of the parts when they are handled by the mechanic during reassembly.

Another type of fluid dispensing apparatus is the time/pressure filler. Generally speaking, the time/pressure filler includes a fluid chamber which is maintained under a relatively constant pressure. The fluid is dispensed from the chamber through a compressible line. Fluid flow is shut off by a pinch type valve which squeezes and collapses the discharge line. A pre-determined volume of fluid is dispensed by opening the discharge line for a pre-determined period of time and then closing the line. If the pressure within the fluid chamber is maintained constant, an equal amount of fluid should be dispensed each time the cycle is repeated. However, time/pressure fillers do not work as well in practice as they do in theory.

The primary difficulty with the time/pressure filling apparatuses is that the tubing is deformed to shut off fluid flow and does not always return to its undeformed state immediately, particularly when the apparatus has been sitting idle for a long period of time. Thus, the critical orifice through which the fluid is dispensed may vary somewhat from the fully open line. The variance in the critical orifice will cause the fluid flow through the discharge line to vary until the discharge line returns to its undeformed condition. As a result, time/pressure fillers will be less accurate during the first few filling cycles.

Based on the foregoing, it is apparent that a need exists for a dispensing apparatus which achieves the same, or better degree of accuracy, as positive displacement fillers without moving parts coming into contact with the fluid.

SUMMARY AND OBJECTS OF THE INVENTION

The present invention is a fluid dispensing apparatus having no moving parts in contact with the fluid being dispensed. The fluid dispensing apparatus includes a fluid chamber having a measuring cup disposed therein. The measuring cup has an open top so that fluid entering the chamber and rising to the top of the cup will overflow the sides and fill the cup. A port in the top of the chamber permits air to pass in and out and may be connected to an air pressure or vacuum line. Precise quantities of liquid are measured by first filling the fluid chamber until the measuring cup is completely submerged. A first sensor indicates when the fluid chamber is filled. When the first fluid level sensor is satisfied, the fluid chamber is then drained. As the fluid in the fluid chamber recedes, a pre-measured quantity of fluid is trapped in the measuring cup. Once the fluid drops to a level below the top of the measuring cup, a discharge line in fluid communication with the measuring cup is opened to dispense the fluid into a waiting receptacle. The discharge valve is then closed and the cycle repeated.

Because there are no moving parts in contact with the fluid, the fluid dispensing apparatus of the present invention virtually eliminates the risk of particulate contamination of the fluid. Additionally, the fluid dispensing apparatus can be cleaned and sterilized in place since there are no moving parts to be removed. The fluid dispensing apparatus achieves these advantages over positive displacement pumps without sacrificing accuracy. Since the present invention employs volumetric principles to measure the quantity of fluid dispensed, it can achieve the same degree of accuracy as positive displacement fillers.

Based on the foregoing, it is a primary object of the present invention to provide a fluid dispensing apparatus in which no moving parts contact the fluid being dispensed.

Another object of the present invention is to provide a fluid dispensing apparatus which is sanitary in design and can be cleaned and sterilized in place.

Another object of the present invention is to provide a fluid dispensing apparatus which avoids the problems of microbial and particulate contamination.

Yet another object of the present invention is to provide a fluid dispensing apparatus which can accurately fill bottles and other receptacles to within ±0.5% of the fill volume.

Another object of the present invention is to provide a fluid dispensing apparatus which is capable of filling bottles having volumes in the range of 1 cc to 720 cc.

Still another object of the present invention is to provide a fluid dispensing apparatus capable of filling up to 300 bottles per minute.

Another object of the present invention is to provide a fluid dispensing apparatus which is simple in construction and reliable in operation.

Other objects and advantages of the present invention will become apparent and obvious from a study of the following description and the accompanying drawings which are merely illustrative of such invention.

DETAILED DESCRIPTION OF THE INVENTION

Figure 1:
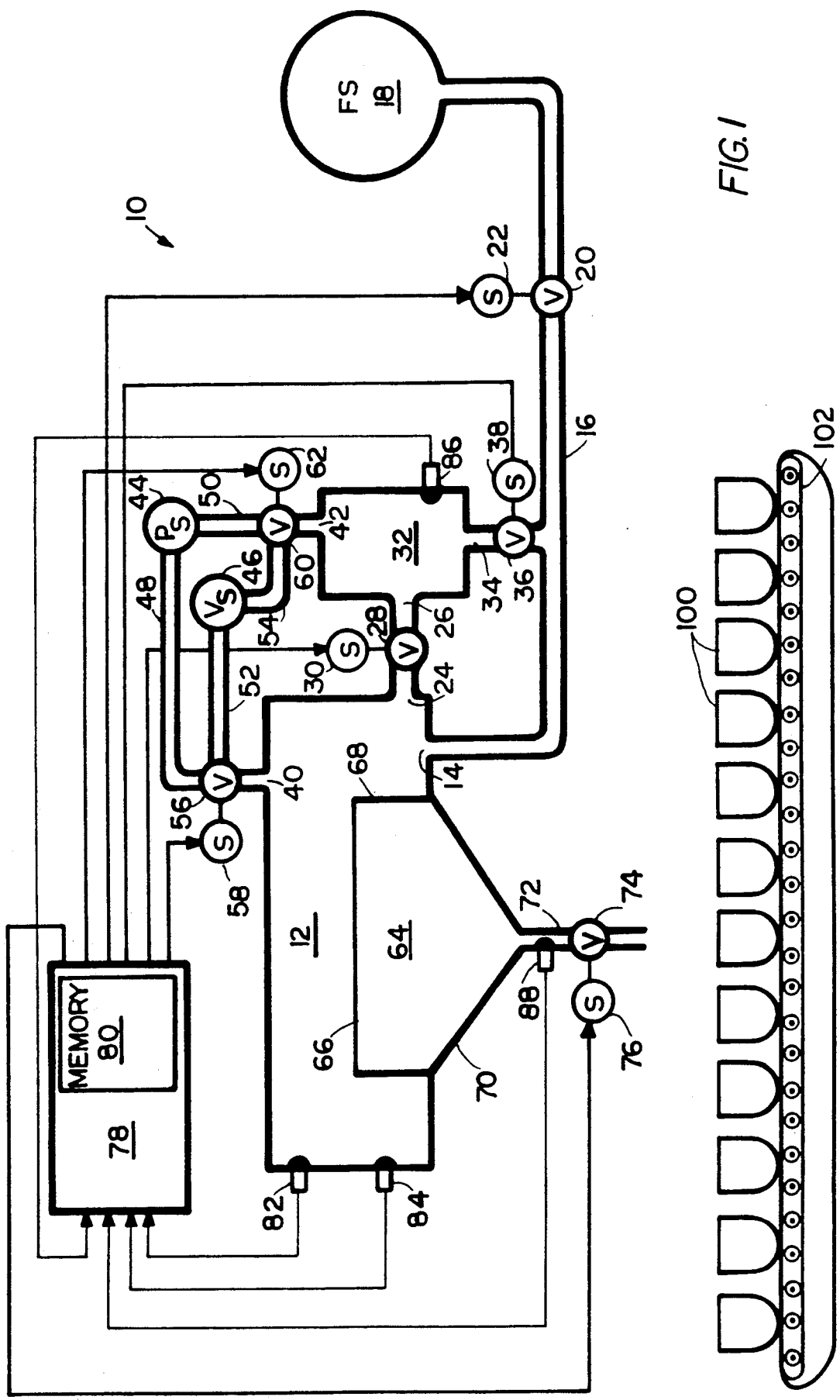
FIG. 1 is a schematic diagram illustrating the fluid dispensing apparatus of the present invention.

Referring now to the drawings, and more particularly to FIG. 1, the dispensing apparatus of the present invention is shown therein and indicated generally by the numeral 10. The dispensing apparatus includes a fluid chamber 12 having a fill port 14 which is connected by a fluid supply line 16 to a fluid source 18. The fluid source 18 typically has a supply pressure of approximately 5-20 psi. The fluid supply line 16 includes a valve 20 which is activated by a solenoid 22. Valve 20 controls the flow of fluid between the fluid source 18 and the fluid chamber 12.

The fluid chamber 12 also includes a drain port 24 connected by line 26 to a reservoir 32. Line 26 includes a drain valve 28 which controls the flow of fluid between the fluid chamber 12 and reservoir 32. The drain valve 28 is actuated by solenoid 30. The reservoir 32 is also connected by a recycle line 34 to the supply line 16. Recycle line 34 includes a valve 36 actuated by solenoid 38. The recycle line 34 permits fluid which is drained from the fluid chamber 12 to be recycled as will be hereinafter described.

The fluid chamber 12 and reservoir 32 both include pressure/vacuum ports, indicated respectively at 40 and 42 which are communicatively connected to a pressure source 44 and a vacuum source 46. Valves 56 and 60 are connected respectively to the pressure/vacuum ports 40 and 42. The pressure source 44 is connected by pressure line 48 to valve 56, and by pressure line 50 to valve 60. The vacuum source is connected by vacuum line 52 to valve 56, and by vacuum line 54 to valve 60. The valves 56 and 60 are actuated by solenoids 58 and 62.

Referring back to the fluid chamber 12, there is at least one measuring cup disposed therein while the drawing shows a single measuring cup 64, it will be readily apparent that multiple measuring cups can be used. Each measuring cup 64 has an open top 66 and side walls 68. The top edge of side walls 68 should preferably be bevelled outwardly. The measuring cups 64 also have an inclined bottom 70 which directs fluid contained therein towards a discharge line 72. The discharge line 72 includes a discharge valve 74 which is actuated by a solenoid 76.

The valves 20, 28, 36, and 74 are pinch-type valves which operate by squeezing the lines in which they are located shut. Thus, the lines 16, 26, 34 and 72 must be made from a compressible, resilient tube. Surgical tubes are particularly well-suited for use with the present invention since they are compatible with a wide range of fluids.

In a preferred embodiment of the fluid dispensing apparatus 10, there are four level sensors 82, 84, 86 and 88. The first level sensor 82 is mounted in the upper portion of the fluid chamber 12 above the top 66 of measuring cup 64. The second level sensor 84 is also mounted in the fluid chamber 12 below the top 66 of the measuring cup 64. The third level sensor 86 is mounted in the reservoir below line 26. The final level sensor 88 is mounted in the discharge line 72. The level sensors 82, 84, 86 and 88 produce input signals which are transmitted to a programmable controller 78. The level sensors 82, 84, 86 and 88 are preferably non-contact sensors such as fiber optic sensors. These type of sensors have no moving parts in contact with the fluid. Additionally, materials used in the construction of fiber optic level sensors provide compatibility with the broad range of liquids.

The dispensing apparatus is used to fill receptacles 100 which may, for example, be carried on a conveyor 102. Those skilled in the art, however, will appreciate that the use of the dispensing apparatus 10 is not so limited and that the described operation is only one way in which the device may be used.

Figure 2:
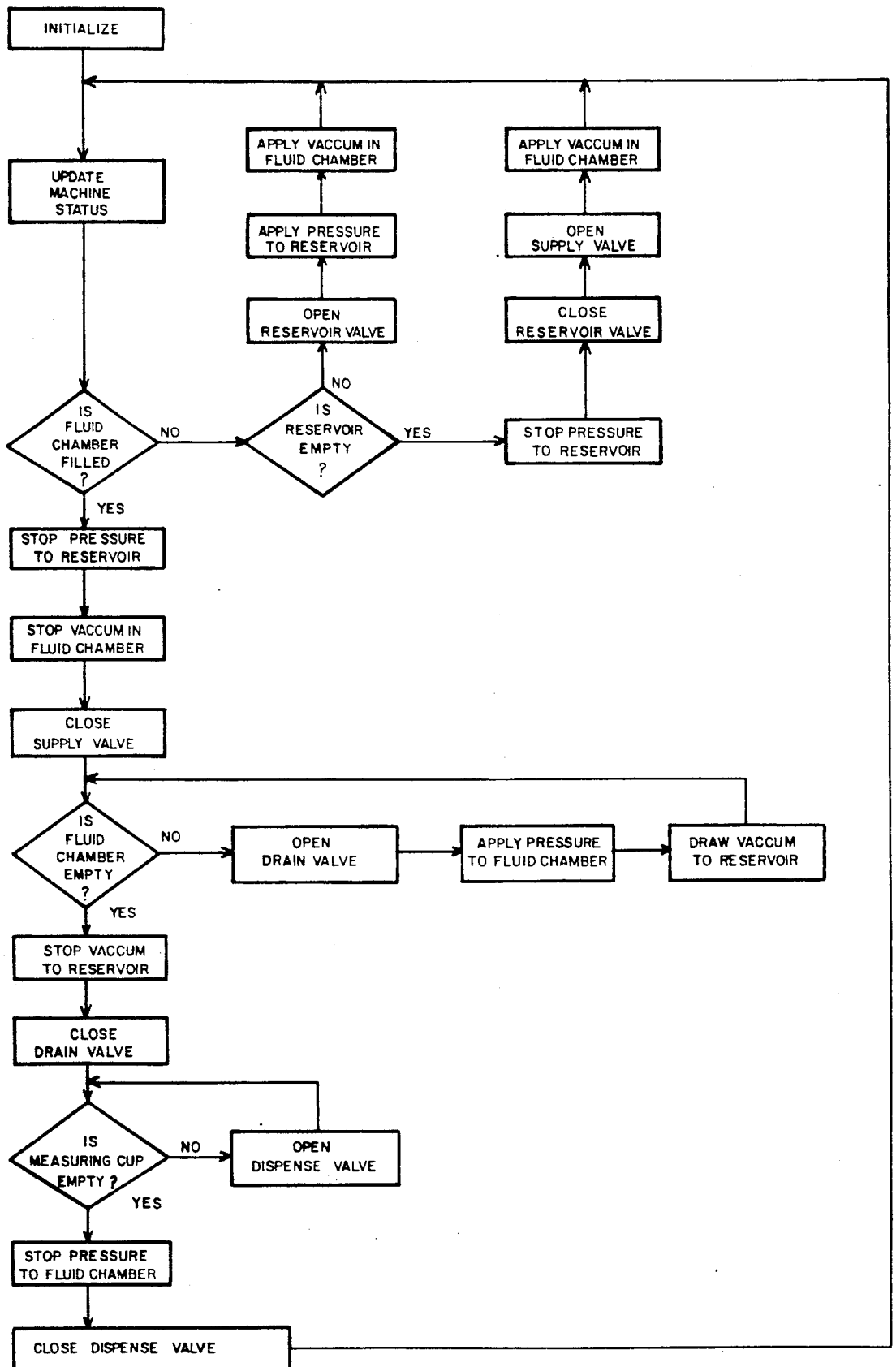
FIG. 2 is a flow diagram illustrating the operation of the fluid dispensing apparatus.

The operation of the dispensing apparatus is controlled by the programmable controller 78 in accordance with programmed instructions stored in its memory 80. The logic of the programmable controller is shown generally by the flow diagram in FIG. 2.

The first step in the operation of the dispensing apparatus is the filling of the fluid chamber 12. During the filling step, excess fluid in reservoir 32 is first recycled. Whether there is fluid in reservoir 32 is determined by sensor 86. If the sensor 88 is satisfied (indicating the pressurized fluid), the programmable controller will then open valve 36 to recycle the fluid in the reservoir 28. The reservoir 32 is pressurized to force the fluid through line 16 into the fluid chamber 12. Alternatively, or in conjunction with the pressurization of the reservoir 32, a vacuum can be applied to the fluid chamber 12. The use of a vacuum will increase the speed of operation. Additionally, the vacuum helps collapse air bubbles entrained in the fluid.

When the reservoir 32 is emptied, the pressure to the reservoir 32 is stopped and valve 36 is closed. To complete the filling of the fluid chamber 12, supply valve 20 is then opened to permit fluid flow from the fluid source 18. If vacuum is already applied to the fluid chamber 12, it will continue to be applied. If vacuum is not being supplied, valve 56 is set to vacuum. The filling of the fluid chamber 12 will continue until the fluid chamber 12 is filled to a pre-determined level above the top of the measuring cup 64. During the filling process, the fluid rising in the fluid chamber 12 will overflow the sides 68 of the measuring cup 64 and fill it.

Sensor 82 will indicate when the fluid chamber is filled to the pre-determined level above the measuring cup 64. At that time, valve 20 is closed stopping the flow of fluid into the fluid chamber 12. Valve 28 is then opened to drain the fluid from the fluid chamber 12 into reservoir 32. Valve 28 remains open until the fluid level drops to a pre-determined level below the top 66 of the measuring cup 64. The fluid chamber 12 may, if desired, be pressurized to speed up operation. Also, a vacuum may be applied to reservoir 32. However, air should not be permitted to enter the fluid chamber 12 too violently since that could disturb the meniscus on the rim of the measuring cup 64. As the fluid level recedes, a pre-determined volume of fluid will be captured in the measuring cup 64. Level sensor 84 will indicate when the fluid level in the fluid chamber 12 reaches the pre-determined level below measuring cup 64 by going unsatisfied. The controller 78 will then close valve 28 stopping the flow of fluid from the fluid chamber 12.

The draining step causes the fluid dispensing apparatus to be slightly slower than positive displacement fillers. Thus, it is desirable to make the excess volume which needs to be drained as small as possible. This goal is accomplished by making the space between the upper and lower sensors 82 and 84 as small as possible. Additionally, it is generally desirable to place the drain line 26 well below the level of sensor 84 to avoid formation of waves at the surface of the fluid.

The final step in the operation of the fluid dispensing apparatus is the dispensing of the fluid from the measuring cup 64. As previously described, valve 74 is opened when the fluid level in fluid chamber 12 drops to a pre-determined level below the top of the measuring cup 64 as indicated by sensor 84. At that time, valve 74 is opened to dispense the fluid. The fluid drains through line 72 into a waiting receptacle 100. Level sensor 86 will indicate when the contents of measuring cup 64 are dispensed by going unsatisfied. The programmable controller 78 will shut off valve 74 to complete the cycle. The cycle will then be repeated indefinitely until the entire apparatus is shut-off.

During the operation of the fluid dispensing apparatus 10, slight waves in the liquid level could cause the level sensors 82 and 84 to change state rapidly causing the valves to chatter on and off. To eliminate this problem, the logic of the controller 78 latches on the signals from the level sensors 82 and 84. That is, when the upper sensor 82 becomes satisfied, the programmable controller 78 ignores any change in state of the sensor until the lower sensor 84 becomes unsatisfied. Conversely, when the lower sensor 84 becomes satisfied, the programmable controller 78 will ignore any change in state of that sensor until the upper sensor 82 becomes satisfied. By latching on the signals from the level sensors 82 and 84, smooth and efficient operation of the fluid dispensing apparatus 10 is assured.

From the foregoing description, it will be apparent that the fluid dispensing apparatus 10 is extremely accurate since the volume of the measuring cup 64 remains constant. Any error is the result of the meniscus of the fluid which is small relative to the total volume of the cup 64. Accuracy can be improved even further by making the level sensor 86 vertically adjustable. Thus, by varying the height of the level sensor 88, each measuring cup 64 can be precisely calibrated to compensate for any inaccuracies during the manufacturing of the cup. Further, the level sensor 88 could be adjusted to compensate for specific gravity changes in fluids.

The present invention overcomes the disadvantages associated with positive displacement pumps since there are no moving parts. Thus, the present invention virtually eliminates the possibility of particulate contamination. Further, the fluid dispensing apparatus can be cleaned and sterilized in place without disassembling the apparatus.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended Claims are intended to be embraced therein.

What is claimed is:
1. A fluid dispensing apparatus, comprising:
a) a fluid chamber;
b) a measuring cup having an open top disposed inside the fluid chamber;
c) means for filing the fluid chamber to a level above the top of the measuring cup including a fluid inlet in the fluid chamber, a fluid supply line connected to a fluid source, and a first valve means disposed in the fluid supply line, wherein the fluid in the fluid chamber overflows and fills the measuring cup when the fluid level rises above the top of the measuring cup;
d) means for draining the fluid from the fluid chamber after the measuring cup is filled including a drain port in the fluid chamber, a drain line connected to the drain port, and a second valve means disposed in the drain line, wherein a pre-determined quantity of fluid is trapped inside the measuring cup when the fluid level drops below the top of the measuring cup; and
e) means for dispensing the contents of the measuring cup after the fluid level in the fluid chamber drops below the top of the measuring cup.

2. The fluid dispensing apparatus according to claim 1 wherein the means for dispensing the contents of the measuring cup includes an outlet port disposed in the bottom portion of the measuring cup, a discharge line connected to the outlet port, and a third valve means disposed in the discharge line.

3. The fluid dispensing apparatus according to claim 2 further including a programmable control means for automatically controlling the first, second and third valve means.

4. The fluid dispensing apparatus according to claim 3 wherein the programmable control means includes a programmable controller having a memory for storing program instructions, a first sensing means for sensing when the fluid level in the fluid chamber rises to a pre-determined level above the top of the measuring cup; a second sensing means for sensing when the fluid level in the fluid chamber drops to a predetermined level below the top of the measuring cup; a third sensing means for sensing when the measuring cup is substantially emptied; and actuating means responsive to the first, second and third sensing means for actuating the first, second and third valve means in accordance with the programmed instructions stored in the programmable controller.

5. A fluid dispensing apparatus, comprising:
a) a fluid chamber;
b) a measuring cup having an open top disposed inside the fluid chamber;
c) fluid supply means providing a source of fluid for filling the fluid chamber to a pre-determined level above the top of the measuring cup, wherein the fluid rising in the fluid chamber overflows to fill the measuring cup;
d) a first sensing means disposed at the pre-determined level above the top of the measuring cup for indicating when the fluid level in the fluid chamber reaches the pre-determined level;
e) draining means responsive to the first sensing means for draining fluid from the fluid chamber to a pre-determined level below the top of the measuring cup, wherein the measuring cup captures a pre-determined volume of fluid when the fluid level drops below the top of the measuring cup;
f) a second sensing means disposed at a pre-determined level below the top of the measuring cup for indicating when the fluid chamber reaches the pre-determined level below the top of the measuring cup;

g) dispensing means responsive to the second sensing means for dispensing the contents of the measuring cup while the fluid level in the fluid chamber remains below the top of the measuring cup; and h) a third sensing means for indicating when the contents of the measuring cup have been dispensed, wherein the fluid supply means is responsive to the third sensing means to fill the fluid chamber.

6. The fluid dispensing apparatus according to claim 5 wherein the fluid supply means comprises a fluid inlet in the fluid chamber, a fluid supply line connected to a fluid source, and a first valve means for selectively controlling the flow of fluid from the fluid source to the fluid chamber.

7. The fluid dispensing apparatus according to claim 6 wherein the first valve means is responsive to the first sensing means to stop the flow of fluid into the fluid chamber; and is responsive to the third sensing means to start the flow of fluid to the fluid reservoir.

8. The fluid dispensing apparatus according to claim 5 wherein the draining means includes a reservoir, a fluid drain line connecting the fluid chamber to the reservoir, and valve means disposed in the fluid drain line for selectively controlling the flow of fluid between the fluid chamber and the reservoir.

9. The fluid dispensing apparatus according to claim 8 wherein the valve means is responsive to the first sensing means to permit the flow of fluid between the fluid chamber and the reservoir, and is responsive to the second sensing means for stopping the flow of fluid from the fluid chamber to the fluid reservoir.

10. A method for automatically dispensing pre-measured volumes of a fluid comprising:

a) providing a fluid chamber;

b) placing a measuring cup with a known volume in the fluid chamber, wherein said measuring cup has a bottom formed with an outlet port, side walls, and an open top;

c) filling the fluid chamber to a pre-determined level above the top of the measuring cup, wherein the fluid rising in the fluid chamber overflows the sides of the measuring cup and causes the measuring cup to be filled;

d) sensing when the fluid level in the fluid chamber reaches the pre-determined level above the top of the measuring cup;

e) lowering the fluid level in the fluid chamber to a pre-determined level below the top of the measuring cup, wherein a pre-determined volume of fluid is captured inside the measuring cup;

f) sensing when the fluid level reaches the pre-determined level below the top of the measuring cup;

g) dispensing the contents of the measuring cup;

h) sensing when the contents of the measuring cup are dispensed; and i) repeating steps (c)–(h).

11. A process for dispensing pre-measured volumes of a fluid comprising:

a) providing a fluid chamber;

b) placing a measuring cup having an open top and an outlet port inside the fluid chamber;

c) filling the fluid chamber to a level above the open top of the measuring cup, wherein the fluid rising in the fluid chamber will overflow the sides of the measuring cup and cause the measuring cup to become filled, d) draining the fluid from the fluid chamber after the measuring cup is filled so that a pre-determined volume of fluid is trapped inside the measuring cup when the fluid level drops below the top of the measuring cup; and e) dispensing the contents of the measuring cup after the fluid level in the fluid chamber drops below the top of the measuring cup.

12. The method according to claim 11 wherein the step of filling the fluid chamber includes applying a vacuum to the fluid chamber to draw fluid from the fluid source into the fluid chamber.

13. The method for dispensing fluid according to claim 11 wherein the step of draining fluid from the fluid chamber includes pressurizing the fluid chamber to force fluid out of the chamber under pressure.

* * * * *